Patented June 17, 1941

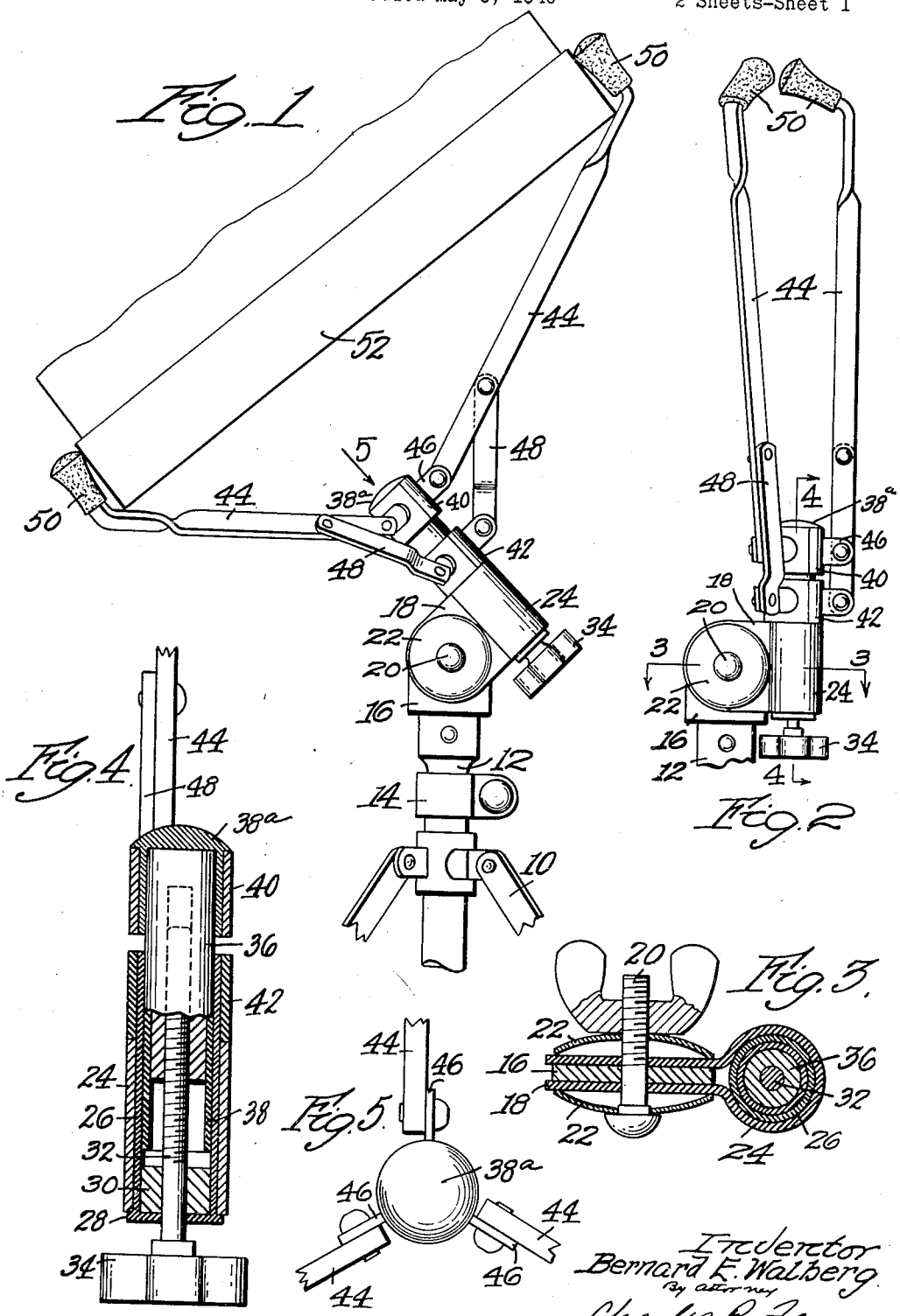

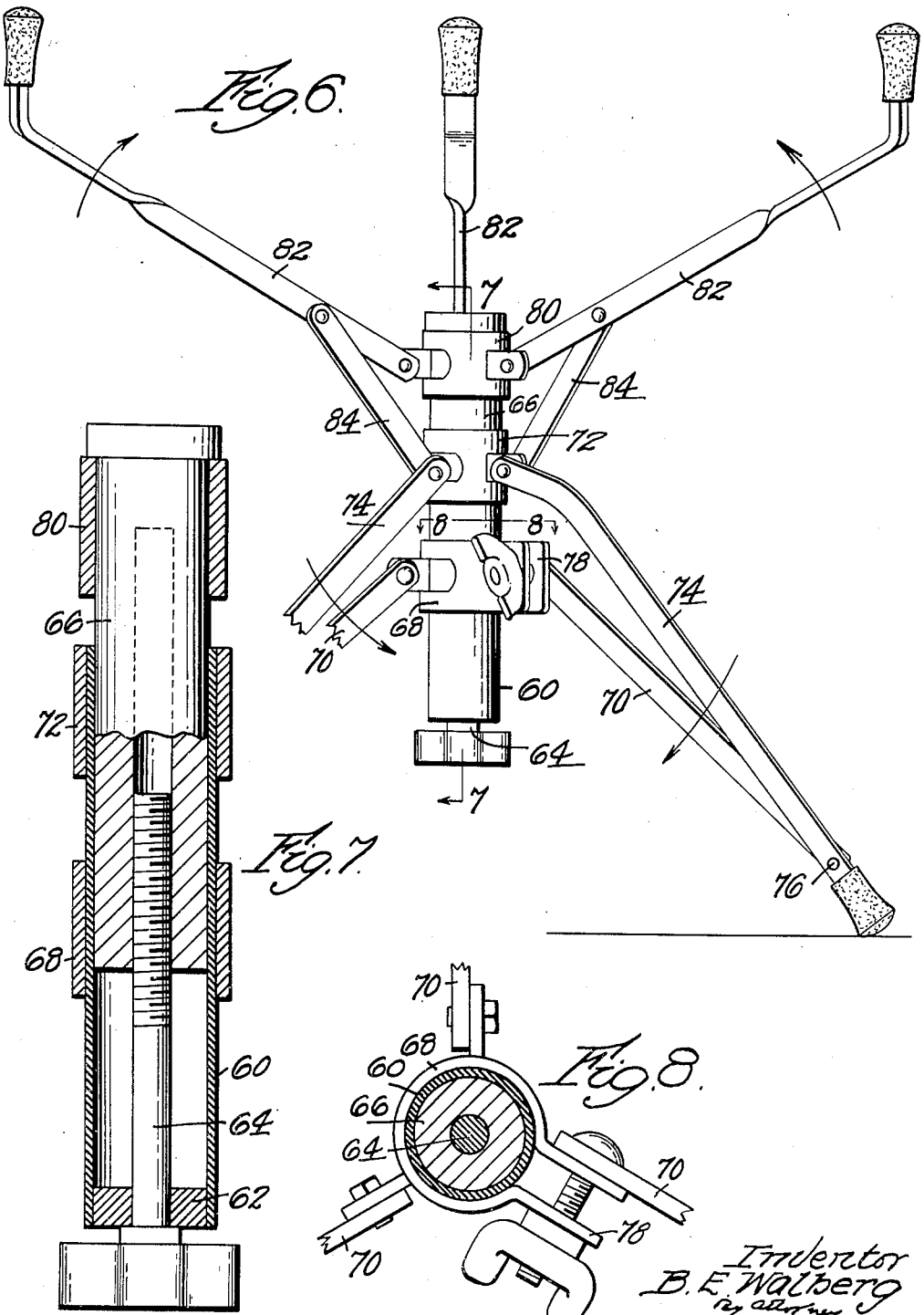

2,245,883

UNITED STATES PATENT OFFICE 2,245,883

STAND FOR DRUM AND THE LIKE

Bernard E. Walberg, Worcester, Mass.

Application May 9, 1940, Serial No. 334,187

8 Claims. (Cl. 84—421)

This invention relates to stands for supporting drums, timpani, and the like.

Objects of the invention include the provision of an improved stand for the purpose described, in which the instrument to be supported will be held steady and will not bounce when struck, and in which the stand will not yield; the provision of such a stand which is comparatively simple in construction and operation and is adapted to support a variety of sizes of instruments with ease and convenience; and the provision of a stand which may be compactly folded and yet easily set up to firmly and steadily support the drum or timpano.

Other objects and advantages of the invention will appear hereinafter.

Reference is to be had to the accompanying drawings, in which

Fig. 1 is a view in elevation of a structure embodying one form of the invention, in drum-supporting condition;

Fig. 2 is a view in elevation of the stand shown in Fig. 1, but with the parts in folded position for carrying;

Fig. 3 is a sectional view along line 3—3 of Fig. 2;

Fig. 4 is a sectional view along line 4—4 of Fig. 2;

Fig. 5 is a detail view looking in the direction of arrow 5 in Fig. 1;

Fig. 6 is a view in elevation of the structure of another form of the invention;

Fig. 7 is a sectional view along line 7—7 of Fig. 6; and

Fig. 8 is a sectional view along line 8—8 of Fig. 6.

In Fig. 1, there is shown the top part of a conventional tripod or support 10 having a spindle 12 upon which the improved drum stand may be rotatably mounted on a vertical axis, and clamped in adjusted position by screw clamp 14. The drum stand is also angularly adjustably mounted on a horizontal axis, as by vertical flat head 16, secured to the top of the spindle. A generally U-shaped spring bracket 18 is positioned so that its legs closely embrace the head 16, and a bolt and wing nut fastening 20 is employed to extend through the head and the bracket legs, to compress concave spring plates 22 to thus firmly clamp the bracket to the head. This arrangement obviously provides for angular adjustment of the bracket 18 about the bolt 20 as an axis.

The bracket 18 is formed so that it has a substantially tube-like portion 24 within which is firmly clamped a second tube-like element 26, the latter being fixed with respect to bracket 18. At its lower end, tube 26 has a flange 28 to act as a stop against the tube 24 and a simple bearing 30 for the sliding and rotary accommodation of screw 32. The latter is provided with a thumb piece 34 for actuation thereof.

A hollow, interiorly threaded spindle 36, having an end flange 38 for guiding it, is slidably arranged in tube 26, and its threads engage the threads of the screw 32. The spindle has a head 38a to engage and form a stop for a cylindrical bracket 40 fixed thereto, and a similar bracket 42 is secured exteriorly to tube 26 and forms, in effect, a continuation of tube 24.

Three equally spaced swingable arms 44 are pivoted to lugs 46 on the bracket 40, and levers 48 are pivoted to bracket 42 and intermediate the ends of arms 44. The arms carry upstanding end lugs 50 which may be rubber covered to prevent marring of the drum 52 which is to be clamped therebetween.

In practice, the tripod 10 may be folded to closed position, and the arms 44 may be manually swung together to urge spindle 36 downwardly into tube 24, to the position as shown in Fig. 2. The stand may be easily and conveniently carried in this condition. To use the stand, it is set upon the tripod 10, and the arms 44 swung down to position shown in Fig. 1, the drum 52 is set in place, and a partial turn on handpiece 34 will serve to draw the spindle 36 downwards, and arms 44 simultaneously together, to firmly grasp the drum. Pressure on the drum will then be transmitted through arms 44 to levers 48, and the tendency will be to raise the spindle, but this is prevented by the abutment of handpiece 34 and flange 38. When the arms 44 are in position, as in Fig. 1, but no drum is present, the weight of the arms tends to overbalance the spindle, and thus the arms drop to the widest extent allowed by the abutment of the elements 34 and 38.

In the prior art, drum supports have been made of flat strip metal, so that pressure near one side of the drum, as a sharp blow, would cause the supporting strips to give, and thus allow the drum to yield or bounce. With the present construction, however, the drum will be firmly held in any position of adjustment at all times, regardless of the degree of vigor with which it is played, as the combination of screw 32, spindle 36, and levers 48 prevents arms 44 from dropping or yielding.

A different form of the invention is shown in Fig. 6, this construction being adapted for the support of timpani. The support is not angularly adjusted, but holds the instrument horizontal.

A tube 60 is provided with an end-bearing 62 for the support of a screw 64, which is threaded into a hollow spindle 66, slidably arranged in the tube. A bracket 68 is positioned to slide on the exterior of the tube and pivotally carries the radial, spaced legs 70. A second bracket 72 is fixed to the tube 60 above bracket 68, and pivotally mounts legs 74 which are pivotally connected adjacent their ends, as at 76, to legs 70. A clamp 78 is used to lock the slidable bracket 68 at any desired position on the tube 60.

A third bracket 80 is fixed adjacent the top of spindle 66, and pivotally mounts the three radial, spaced arms 82, and levers 84 are pivoted to the pivot pins of legs 74 and intermediate the arms 82.

The operation of the arms 82 to clamp the drum or timpano is similar to the operation of the device as disclosed in Fig. 1, but in Fig. 6 it will be noted that the tube 60 which houses the spindle 66 also acts as a support for the sliding bracket 68. Of course, the legs 70, 74, and arms 82 may be mutually brought together so that the stand is folded for carrying. In such position, spindle 66 will be located at its innermost position with respect to tube 60.

It will be seen from the above that a relatively simple but very steady and convenient drum stand has been provided by the present invention, and that the supported drum will be evenly clamped in three directions by the convergence of the arms.

Having thus described my invention and the advantages thereof, I do not wish to be limited to the details herein disclosed, otherwise than as set forth in the claims, but what I claim is:

1. As an article of manufacture, a stand for drums or the like, comprising a substantially hollow supporting element, a member slidable in said element and having an end extending therefrom, a plurality of clamping arms pivoted to the extending end of said member, and a link connecting each arm and said element, whereby movement of said member in one direction causes said arms to approach each other to grasp the periphery of a drum or the like.

2. In a device of the class described, a support, a generally U-shaped bracket angularly adjustable on said support, said bracket having a substantially tubular portion attached thereto, a member slidably arranged within said tubular portion and having a part thereof extending therefrom, a plurality of arms movably connected to the extending part of said member, and means adapted to move said arms simultaneously towards each other to grasp a drum or the like therebetween upon the movement of said member in one direction, said means comprising a link pivoted to each arm and to said bracket.

3. In a device of the class described, a bracket adapted to be mounted on a support, said bracket having a tubular portion, a member slidably mounted in said portion and having an end extending therefrom, said member being threaded, a screw engaging in said threads and having a reaction point on said tubular portion whereby said member is adapted to be drawn into said tubular portion by the actuation of said screw, a plurality of arms pivotally mounted on the extending portion of said member, and rigid link means connecting said arms and said tubular portion.

4. An article of manufacture as recited in claim 1 including means to move said member relative to said element.

5. An article of manufacture as recited in claim 1 including supporting legs secured to said element.

6. An article of manufacture as recited in claim 1 including supporting legs, a bracket adjustably mounted on said legs, and means on said bracket to engage and hold said element.

7. An article of manufacture as recited in claim 1 wherein said member is adapted to extend from one end only of said hollow element, and including a stop at the other end of said element, and means extending thru said stop and engaged with said member to adjust the latter relative to said element.

8. An article of manufacture as recited in claim 1 wherein said member extends from said hollow element at one end of the latter, a bearing at the other end of said element, a rod in said bearing adapted for rotary and sliding motion with relation thereto, said rod having a screw-thread engagement with said member.

BERNARD E. WALBERG.